United States Patent
Iourcha et al.

(10) Patent No.: US 6,175,851 B1
(45) Date of Patent: *Jan. 16, 2001

(54) FAST ADDER/SUBTRACTOR FOR SIGNED FLOATING POINT NUMBERS

(75) Inventors: Konstantine I. Iourcha, San Jose; Andrea Nguyen, Cupertino; Daniel Hung, Santa Clara, all of CA (US)

(73) Assignee: S3 Incorporated, Santa Clara, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/020,152

(22) Filed: Feb. 6, 1998

(51) Int. Cl.[7] ..................................................... G06F 7/38
(52) U.S. Cl. ................................................................ 708/505
(58) Field of Search .................................. 708/495, 501, 708/505, 700, 706

(56) References Cited

U.S. PATENT DOCUMENTS

| | | | |
|---|---|---|---|
| 5,122,981 | * 6/1992 | Taniguchi | 708/497 |
| 5,146,419 | * 9/1992 | Miyoshi et al. | 708/505 |
| 5,282,156 | * 1/1994 | Miyoshi et al. | 708/505 |
| 5,627,773 | * 5/1997 | Wolrich et al. | 708/505 |
| 5,684,729 | * 11/1997 | Yamada et al. | 708/505 |

* cited by examiner

*Primary Examiner*—Chuong Dinh Ngo
(74) *Attorney, Agent, or Firm*—Fenwick & West LLP (57) ABSTRACT

A system for adding or subtracting numbers in signed floating point notation performs exponent and mantissa handling operations in parallel. The system includes a comparator, for determining a greater-magnitude and a lesser magnitude floating point number, operating in parallel with a selector for performing a one's complement and single-bit shift on a mantissa portion of the lesser-magnitude floating point number. The system further includes a remaining shift circuit, for determining an additional amount by which the lesser-magnitude mantissa portion should be shifted; and a shifter. The system also includes an absolute add circuit, for determining whether an absolute addition or an absolute subtraction is to be performed, and a single-bit shift circuit, for indicating whether a shift of at least one bit is required.

13 Claims, 10 Drawing Sheets

Fast Adder/Subtractor Schematic

FIG. 5
Fast Adder/Subtractor Schematic

FIG. 6

ABSADD Circuit (102)
Schematic

FIG. 7

SHF1 Circuit (104)
Schematic

FIG. 8

Magnitude Comparator
Circuit (106)
Schematic

FIG. 9

Selector Circuit (108)
Schematic

| SHF1 | ABSADD | APPROPRIATE MANTISSA PORTION SELECTED | |
|---|---|---|---|
| 0 | 0 | One's complement of mantissa | ~mantissa 1 |
| 0 | 1 | Mantissa right-shifted by one bit | 0 mantissa |
| 1 | 0 | One's complement of mantissa right-shifted by one bit | 1 ~mantissa |
| 1 | 1 | Mantissa right-shifted by two bits | 0 mantissa 0 |

FIG. 10
Mantissa Selection Table

Remaining Shift Count
Circuit (110)
Schematic

Resulting Sign Signal
Circuit (116)
Schematic

FIG. 14

Resulting Exponent
Circuit (118)
Schematic

FIG. 15

Resulting Exponential
Increment Signal (120)
Schematic

FIG. 16

FAST ADDER/SUBTRACTOR FOR SIGNED FLOATING POINT NUMBERS

FIELD OF THE INVENTION

The present invention relates to a system and method for performing floating point calculations, and more particularly, to a circuit for adding or subtracting signed floating point numbers.

BACKGROUND OF THE INVENTION

Digital circuits and methods for performing arithmetic operations on signed floating point numbers are well known in electrical engineering and are used in numerous applications ranging from computer graphics to scientific calculation. Herein, IEEE and/or IEEE-compatible floating point numbers are considered, which comprise a sign bit, an exponent portion, and a mantissa portion. Each aforementioned portion is represented by a particular number of bits, in a manner well understood by those skilled in the art.

Figure 1:
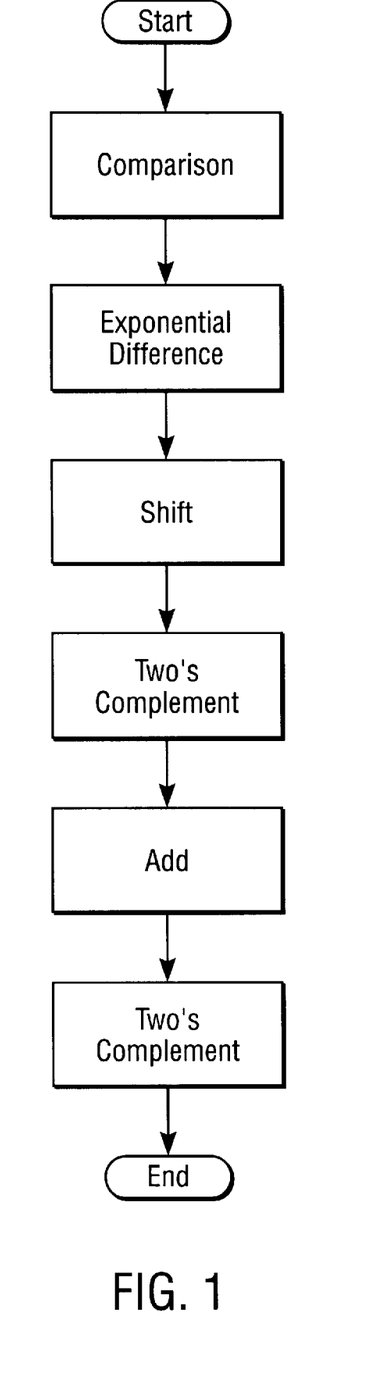
FIG. 1 is a flowchart showing steps typically employed by conventional floating point adder/subtractor logic.

FIG. 1 is a flowchart showing steps typically employed by conventional floating point adder/subtractor logic. Conventional techniques for adding or subtracting two numbers in IEEE floating point notation usually require an alignment of the mantissas so that both numbers' exponents are rendered equal prior to the operation. This is typically accomplished by first comparing and determining the exponential difference between the two numbers, and then shifting the mantissa of the smaller number to the right until the exponents are equal.

When a floating point operation corresponding to an absolute subtraction is to be performed, two's complement is applied to the mantissa of number to be subtracted. The two mantissas are then added together, and, if necessary, two's complement is applied to the result to ensure that the resulting magnitude is in absolute terms.

Those skilled in the art will recognize that the operations shown in FIG. 1 do not produce a normalized floating point number. Thus, additional steps are required to convert the number into normalized IEEE floating point notation. Additional steps are also required to handle special results such as Not-a-Number (NaN), infinity, or overflow. Such additional steps are well known, and are therefore not considered herein.

As shown in FIG. 1, conventional floating point adder/subtractor logic typically employs six serial steps. The performance of these steps in serial increases both the latency and the cost of conventional adder/subtractor logic. Assuming that each serial step requires a fixed amount of time, then completion of all six serial steps would require six times this fixed amount of time, regardless of the details of the logic used to implement the individual serial steps. As a result, a finite boundary is placed on the speed capabilities of conventional floating point adder/subtractors.

Conventional adder/subtractor logic also undesirably requires the implementation of at least two sets of two's complement logic. Two's complement logic is relatively expensive since each two's complement that is performed requires increment and carry logic.

Therefore, there remains a need for a high speed circuit for adding and subtracting signed floating point numbers that reduces the number of required sequential steps and simultaneously reduces cost.

SUMMARY OF THE INVENTION

The present invention overcomes the deficiencies and limitations of the prior art with a novel system of adding or subtracting signed floating point numbers. The system of the present invention advantageously performs a comparison of two signed floating point inputs in parallel with a single bit shift, an exponential difference and a one's complement computation on both inputs. Performing the comparison, single bit shift, exponential difference and one's complement computation in parallel advantageously reduces the number of sequential steps required to add or subtract the signed floating point number inputs. The comparison also eliminates the need for additional hardware necessary to perform two's complement for subtractions. Moreover, the system advantageously combines a two's complement computation with an additional step by using a single bit as a carry-in (or rounding) to an adder. As a result, the present invention significantly increases the overall speed and efficiency of the system while simultaneously reducing cost.

A fast adder/subtractor for signed floating point numbers constructed in accordance with the present invention includes a comparator and a selector. The comparator is coupled to receive a mantissa portion and an exponent portion of a first signed floating point number and a mantissa portion and an exponent portion of a second signed floating point number and is used to determine which of the signed floating point number has a greater magnitude. The selector is coupled to receive the mantissa portions of the first and second signed floating point numbers and is used to select the appropriate mantissa portions of both numbers for the operation. More specifically, the selector is coupled to receive a one's complement of the mantissa portion of both numbers, the mantissa portion of both numbers right shifted by one bit, a one's complement of the mantissa portion of both numbers right shifted by one bit, and the mantissa portion of both numbers right shifted by two bits. A fast adder/subtractor for signed floating point numbers embodying the principles of the present invention further includes an absolute addition signal circuit, for indicating whether an absolute addition or an absolute subtraction is to be performed; a single-bit shift circuit, for indicating whether at least a single bit shift is to be performed; a remaining shift count circuit, for determining an amount by which the mantissa portion of the lesser of the two signed floating point number inputs needs to be shifted further; and an adder, for producing a resulting mantissa portion.

The features and advantages described in the specification are not all inclusive and, in particular, many additional features and advantages will be apparent to one of ordinary skill in the art in view of the drawings, specifications, and claims. Moreover, it should be noted that the language used in the specification has been principally selected for readability and instructional purposes.

DETAILED DESCRIPTION OF THE PREFERRED EMBODIMENT

The present invention is a low-latency adder/subtractor that preferably operates upon explicit IEEE-compatible floating point numbers. Herein, an explicit IEEE compatible floating point number comprises a signal having a sign bit, a certain number of exponent bits that express an exponent with a fixed bias, and a certain number of mantissa bits, where the mantissa includes an explicit, or stored, leading 1. In the preferred embodiment, the present invention operates upon floating point numbers having a single-bit sign portion, an 8-bit standard IEEE biased exponent portion, and a 20-bit explicit mantissa portion. Those skilled in the art will recognize that in an alternate embodiment, the present invention could operate upon floating point numbers represented in another format, such as implicit IEEE-compatible floating point numbers, in which the mantissa portions have an implied leading 1 that is not stored.

Figure 2:
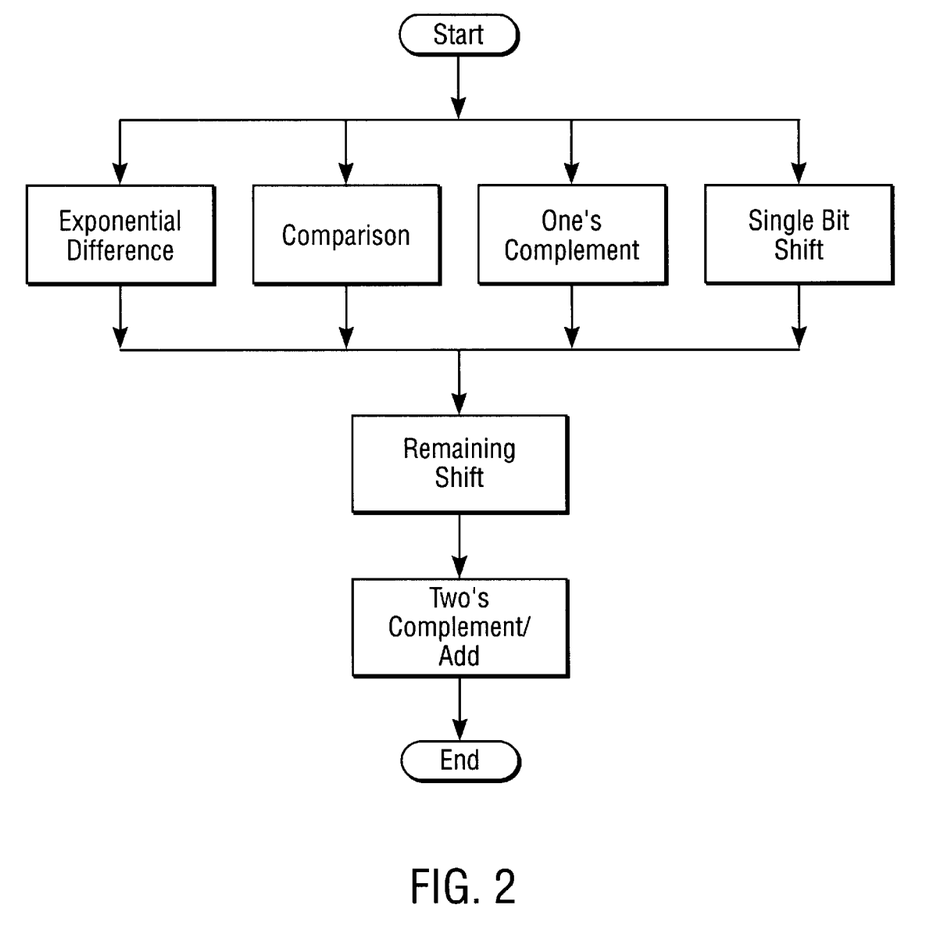
FIG. 2 is a flowchart of a preferred method for performing fast floating point addition/subtraction in accordance with the present invention.

FIG. 2 is a flowchart of a preferred method for performing fast floating point addition/subtraction in accordance with the present invention. The present invention minimizes latency by performing exponent and mantissa handling operations in parallel, and eliminating a two's complement operation performed in the prior art. In the preferred method, the present invention initiates the addition or subtraction of two floating point numbers by simultaneously determining an exponent difference; comparing the numbers' magnitudes; and selectively applying one's complement and/or single-bit shift operations to the numbers' mantissas, as described in detail below. After these parallel operations, the present invention performs any necessary additional shifting, followed by an addition that selectively completes a two's complement operation to produce a result.

Figure 3:
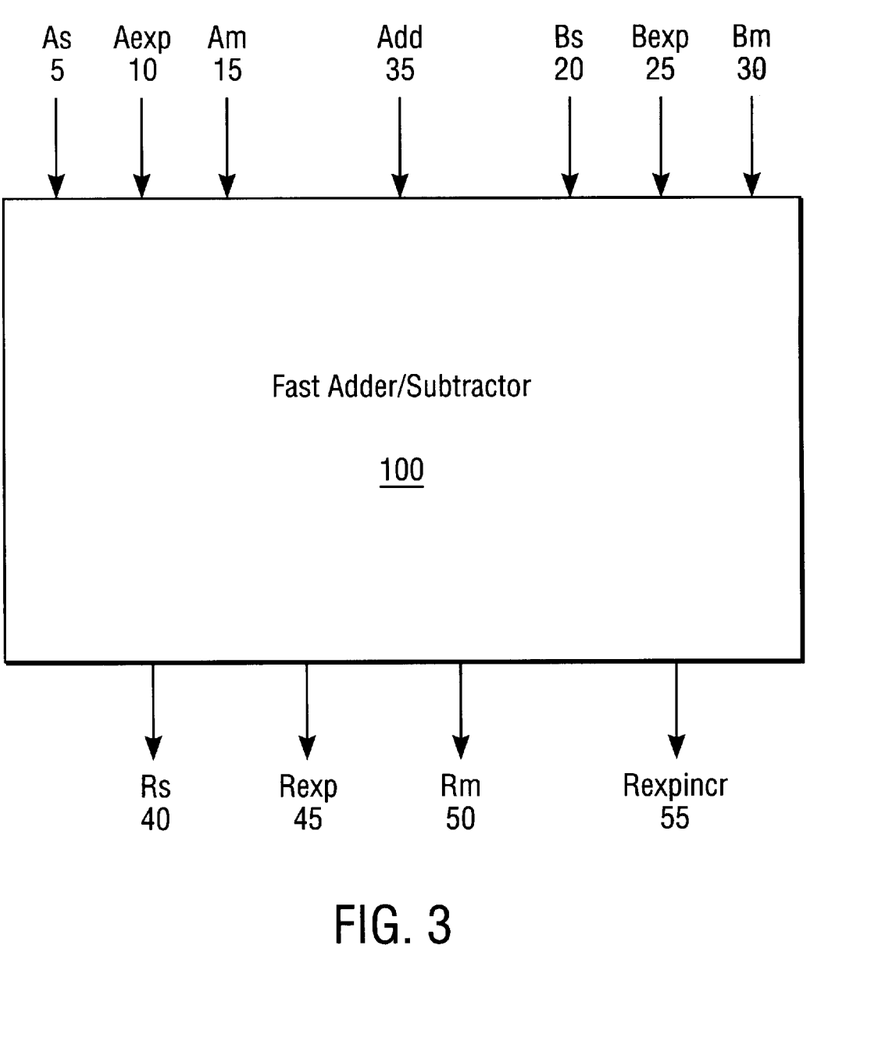
FIG. 3 is a high-level block diagram of a fast adder/subtractor constructed in accordance with the present invention.

FIG. 3 is a high-level block diagram of a fast adder/subtractor 100 constructed in accordance with the present invention. The fast adder/subtractor 100 receives signals or bits comprising a first sign portion As, a first exponent portion Aexp, and a first mantissa portion Am of a first floating point number A via a first sign input line 5, a first exponent input line 10, and a first mantissa input line 15, respectively. Similarly, the fast adder/subtractor 100 respectively receives a second sign portion Bs, a second exponent portion Bexp, and a second mantissa portion Bm of a second floating point number B via a second sign input line 20, a second exponent input line 25, and a second mantissa input line 25.

The fast adder/subtractor 100 further receives an add/subtract signal via an add input line 35. In the preferred embodiment, the fast adder/subtractor 100 adds A and B when the add/subtract signal equals 1 or logic high. Otherwise, the fast adder/subtractor 100 subtracts B from A.

The fast adder/subtractor 100 generates a set of result bits R comprising a resulting sign portion Rs, a resulting exponent portion Rexp, a resulting mantissa portion Rm, and a resulting exponent increment signal Rexpincr at corresponding resulting sign, resulting exponent, resulting mantissa, and resulting exponent increment output lines 40, 45, 50, 55, respectively.

Figure 4:
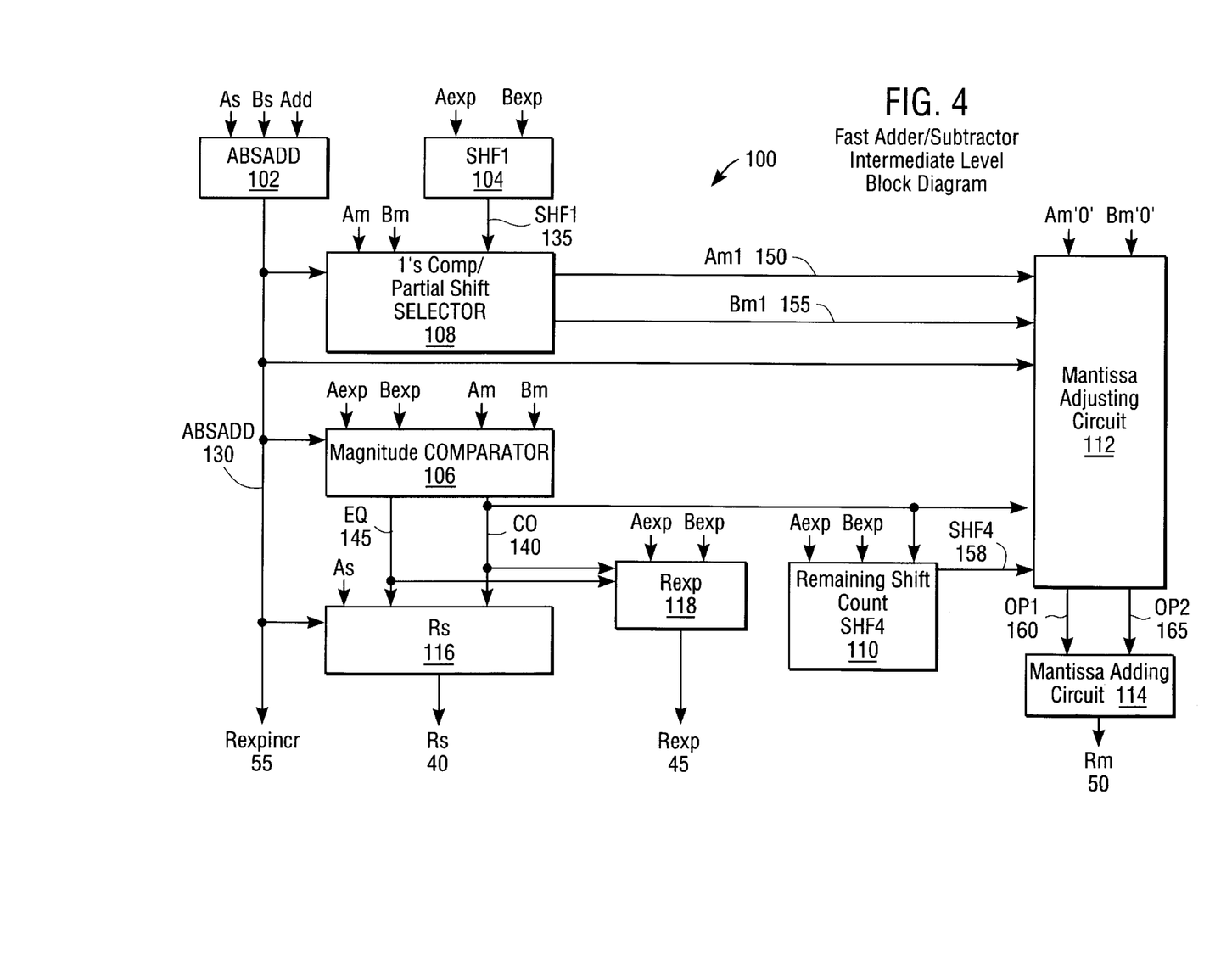
FIG. 4 is an intermediate-level block diagram of a fast adder/subtractor constructed in accordance with the present invention.

FIG. 4 is an intermediate-level block diagram of one embodiment of a fast adder/subtractor 100 constructed in accordance with the present invention. The fast adder/subtractor 100 comprises an absolute add circuit 102, a single-bit shift signal circuit 104, a magnitude comparator 106, a one's complement/single-bit shift selector 108, a remaining shift count circuit 110, a mantissa adjusting circuit 112, a mantissa adding circuit 114, a resulting sign circuit 116, and a resulting exponent circuit 118.

With the exception of the mantissa adding circuit 114, each element within the fast adder/subtractor 100 receives signals from particular fast adder/subtractor inputs 5, 10, 15, 20, 25, 30, 35 described above in relation to FIG. 3. Specifically, the absolute add circuit 102 is coupled to the first and second sign input lines 5, 20, as well as the add/subtract line 35. Each of the single-bit shift circuit 104, the magnitude comparator 106, the remaining shift count circuit 110, and the resulting exponent circuit 118 is coupled to the first and second exponent input lines 10, 25. The magnitude comparator 106, the one's complement/single-bit shift selector 108, and the mantissa adjusting circuit 112 are coupled to the first and second mantissa input lines 15, 30. Finally, the resulting sign circuit 116 is coupled to the first sign input line 5.

The fast adder/subtractor's internal inter-element couplings include an absolute add line 130 that couples the absolute add circuit 102, the magnitude comparator 106, the one's complement/single-bit shift selector 108, the mantissa adjusting circuit 112, and the resulting sign circuit 116. In addition, a single-bit shift line 135 couples the single-bit shift signal circuit 104 to the one's complement/single-bit shift selector 108. Also, a comparison signal line 140 couples the magnitude comparator 106, the remaining shift count circuit 110, the mantissa adjusting circuit 112, the resulting sign circuit 116, and the resulting exponent circuit 118. An equal signal line 145 couples the magnitude comparator 106, the resulting sign circuit 116, and the resulting exponent circuit 118.

Other inter-element couplings involve the mantissa adjusting circuit 112, including first and second selected mantissa lines 150, 155 that originate from the one's complement/single bit shift selector 108; a remaining shift count line 158 that originates from the remaining shift count circuit 110; and first and second operand lines 160, 165 received by the mantissa adding circuit 114.

In terms of the fast adder/subtractor outputs 40, 45, 50, 55 described earlier in relation to FIG. 3, the resulting sign circuit 116, the resulting exponent circuit 118, and the mantissa adding circuit 114 include outputs from which the resulting sign output line 40, the resulting exponent output line 45, and resulting mantissa output line 50 originate, respectively. In the preferred embodiment, the resulting exponent increment line 55 is taken from the absolute add line 130.

Figure 5:
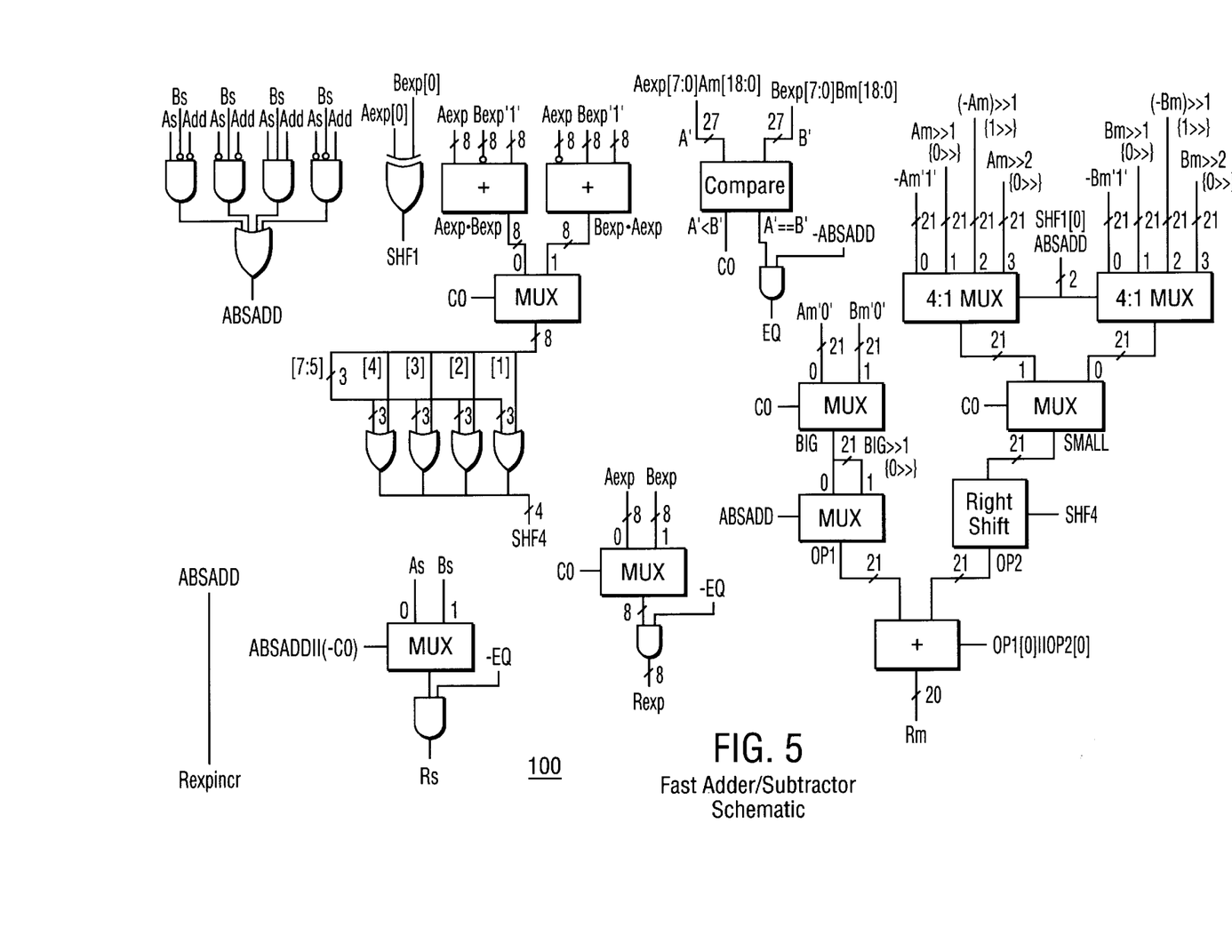
FIG. 5 is a circuit diagram of a preferred embodiment of a fast adder/subtractor constructed in accordance with the present invention.

The structure and operation of each element of the fast adder/subtractor 100 is described in detail hereafter, with respect to FIGS. 5 through 15. FIG. 5 is a circuit diagram or schematic showing a preferred embodiment of a fast adder/subtractor 100 constructed in accordance with the present invention. FIGS. 6 through 9 and 11 through 15 are circuit diagrams of portions of FIG. 5 that are grouped or organized to correspond to particular elements shown in FIG. 4, as described in detail below.

Those skilled in the art will understand that the magnitude of the result obtained when adding or subtracting two numbers may be equivalent to an addition or subtraction of the individual numbers' magnitudes, depending upon the numbers' signs. In the context of the present invention, an absolute addition condition exists when the magnitude of the sum of or difference between two floating point numbers A and B is equivalent to the addition of the two numbers' magnitudes. Thus, cases in which $|A + B| = |A| + |B|$     (A positive, B positive)

$|A + B| = |(-|A|) + (-|B|)| = |A| + |B|$     (A negative, B negative)

$|A - B| = ||A| - (-|B|)| = |A| + |B|$     (A positive, B negative)

$|A - B| = |(-|A|) - |B|| = |A| + |B|$     (A negative, B positive)

correspond to an absolute addition condition.

Similarly, an absolute subtraction condition exists when the magnitude of the sum of or difference between two floating point numbers is equivalent to the subtraction of the two numbers' magnitudes. That is, cases in which $|A + B| = ||A| + (-|B|)| = |A| - |B|$     (A positive, B negative)

$|A + B| = |(-|A|) + |B|| = |B| - |A|$     (A negative, B positive)

$|A - B| = |A| - |B|$     (A positive, B positive)

$|A - B| = |(-|A|) - (-|B|)| = |B| - |A|$     (A negative, B negative)

correspond to an absolute subtraction condition.

Finally, when two floating point numbers have equal magnitudes, i.e., $|A|=|B|$, an absolute equal condition exists. As further explained below, the present invention performs an absolute add operation or an absolute subtract operation to generate a resulting mantissa portion Rm, while concurrently generating a resulting sign portion Rs that correctly indicates whether Rm is positive or negative.

Figure 6:
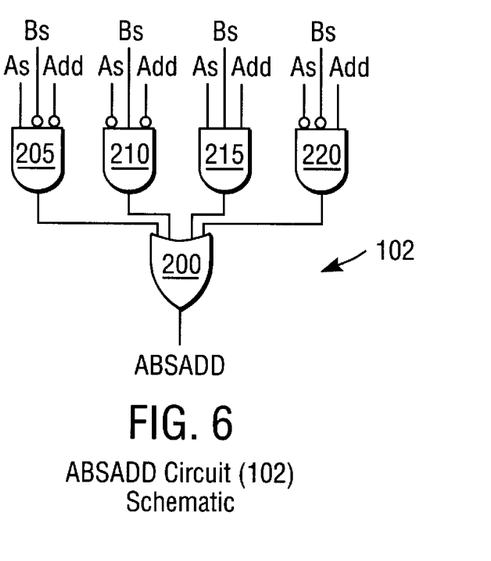
FIG. 6 is a circuit diagram of a preferred embodiment of an absolute add signal circuit of the invention.

FIG. 6 is a circuit diagram of a preferred embodiment of the absolute add circuit 102 of the present invention. The absolute add circuit 102 determines whether an absolute addition condition or an absolute subtraction condition exists based upon the operation required and the signs of the numbers involved. The absolute add circuit 102 comprises an OR gate 200 and four AND gates 205, 210, 215, 220. Each AND gate 205, 210, 215, 220 is coupled to receive a sign bit or an inverted sign bit from each floating point number, as well as the add/subtract signal or its inverse, in accordance with the absolute addition conditions specified above. Throughout the description herein, the presence of a given signal is also taken to imply the availability of an inverted or complemented version of the signal as needed, which can be generated via conventional techniques that are well understood by those skilled in the art.

A first AND gate 205 within the absolute add circuit 102 is coupled to receive the sign bit of A, the inverted sign bit of B, and the inverted add/subtract signal. A second AND gate 210 is coupled to receive the inverted sign bit of A, the sign bit of B, and the inverted add/subtract signal. A third AND gate 215 is coupled to receive the sign bits of A and B, plus the add/subtract signal. Finally, a fourth AND gate 220 is coupled to receive the inverted sign bit of A, the inverted sign bit of B, and the add/subtract signal.

The OR gate 200 is coupled to receive an output from each AND gate 205, 210, 215, 220. The OR gate 200 exerts an absolute add signal (ABSADD) at an output that forms the absolute add signal line 130. When the ABSADD signal equals 1, or logic high, an absolute addition condition exists; otherwise, an absolute subtraction condition exists. As further described below, when the ABSADD signal equals 1, the magnitudes of the two floating point numbers are added. When ABSADD equals 0, the present invention applies a one's complement to the floating point number having the smaller magnitude, and then performs an addition that selectively completes a two's complement to produce a result.

Figure 7:
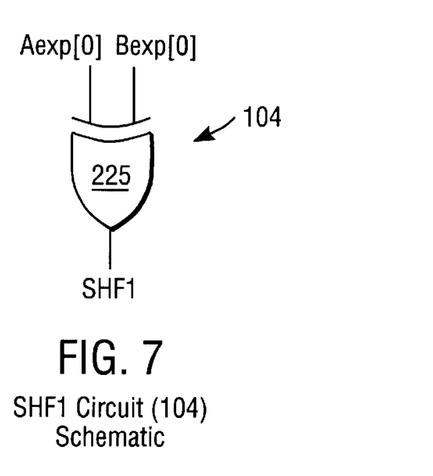
FIG. 7 is a circuit diagram of a preferred embodiment of a single bit shift signal circuit of the present invention.

FIG. 7 is a circuit diagram of a preferred embodiment of the single-bit shift circuit 104 of the present invention. The single-bit shift circuit 104 comprises an exclusive-OR (XOR) gate having a first input coupled to receive the least significant bit (LSB) of the first exponent portion, Aexp(0); and a second input coupled to receive the LSB of the second exponent portion, Bexp(0). The XOR gate generates a single-bit shift signal (SHF1) at an output that forms the single-bit shift line 135. In the event that the difference between the two LSB's is odd, SHF1 equals 1, indicating that the mantissa portion of the floating point number having the smaller exponent requires at least a one-bit shift.

Figure 8:
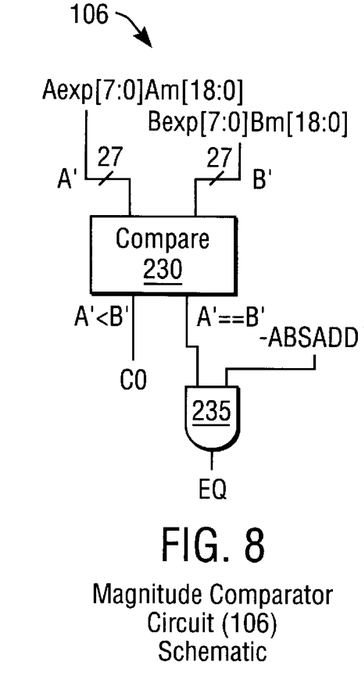
FIG. 8 is a circuit diagram of a preferred embodiment of a magnitude comparator of the present invention.

FIG. 8 is a circuit diagram of a preferred embodiment of the magnitude comparator 106 of the present invention. The magnitude comparator 106 comprises a comparator circuit 230 that includes, for example, a comparator or a less-than comparator, and an AND gate 235. The comparator circuit 230 is coupled to receive the first exponent portion Aexp, the first mantissa portion Am, the second exponent portion Bexp, and the second mantissa portion Bm in the manner shown. The comparator circuit 230 includes a first output from which the comparison signal line 140 originates, and a second output that is coupled to an input of the AND gate 235. The AND gate 235 also includes an input coupled to receive an inverted version of the ABSADD signal, and an output from which the equal signal line 145 originates.

The comparator circuit 230 outputs a comparison signal (CO) upon the comparison signal line 140, such that CO equals 1 or logic high when the magnitude of the first floating point number A is less than that of the second floating point number B. CO equals 0 or logic low otherwise. As described in detail below, the present invention utilizes the CO signal for magnitude-based mantissa portion selection and shifting operations. In the event that the magnitudes of A and B are equal (i.e., an absolute equal condition exists), the comparator circuit 230 generates a 1 or logic high at its second output.

The AND gate 235 generates an equal signal (EQ) at its output. In the preferred embodiment, EQ is 0 or logic low unless a) the magnitudes of A and B are equal (that is, the exponent portions Aexp and Bexp are equal, as are the magnitudes of the mantissa portions Am and Bm); and b) an absolute subtract condition exists (as indicated by the ABSADD signal), in which case EQ is 1 or logic high. Therefore, when EQ is 1, the result output by the fast adder/subtractor 100 should correspond to zero. Those skilled in the art will recognize that in accordance with IEEE floating point number representation, a floating point number having its exponent bits set to zero is considered to be zero. In the preferred embodiment, when EQ is 1, the present invention sets the resulting sign and exponent portions (Rs and Rexp) to zero, as further described below with reference to FIGS. 14 and 15.

To generate the resulting mantissa portion Rm, the fast floating point adder/subtractor 100 adds or subtracts the first and second mantissa portions Am and Bm, where one mantissa portion may be shifted relative to the other. Thus, four possibilities exist for handling the first and second mantissa portions, namely: a) subtraction of the mantissa portions with no shift involved; b) addition of the mantissa portions with no shift involved; c) subtraction of one mantissa portion from the other, with one mantissa portion shifted; and d) addition of the mantissa portions, with one mantissa portion shifted.

In conventional subtraction operations, a two's complement is applied to the subtrahend (i.e., the number that is to be subtracted) by sequentially applying a one's complement (formed by bitwise inversion) and adding 1. For the above mantissa portion handling possibilities that involve subtraction, the present invention maintains a mantissa portion in one's complement form until a final addition stage, as further described below.

Figure 9:
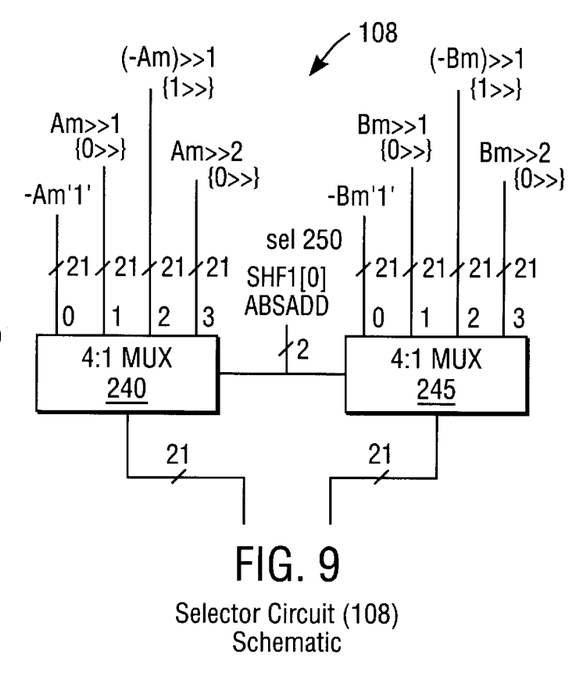
FIG. 9 is a circuit diagram of a preferred embodiment of a one's complement/partial shift selector of the present invention.

To maintain accuracy, it is desirable to perform the addition or subtraction operation upon (n+1)-bit versions of the mantissa portions. The one's complement/single bit shifter 108 inserts or appends a 0 or 1 bit to an appropriate end of mantissa portions Am and Bm, as well as their one's complements, to produce (n+1)-bit mantissa portions that selectively incorporate a partial shift. Preferably, an extra bit to be appended to a mantissa portion is sourced in a hardwired manner, as well understood by those skilled in the art.

FIG. 9 is a circuit diagram of a preferred embodiment of the one's complement/single-bit shifter 108 of the present invention, which comprises a first 4:1 multiplexer 240 and a second 4:1 multiplexer 245. Each 4:1 multiplexer 240, 245 includes a set of inputs; a selection input coupled to receive the SHF1 and ABSADD signals as high-order and low-order control bits, respectively; and outputs that respectively form the first and second selected mantissa lines 150, 155.

In low-order to high-order sequence, the first 4:1 multiplexer 240 is preferably coupled to receive a) the one's complement of the first mantissa portion with a 1 or logic high value appended to its LSB; b) the first mantissa portion with a 0 or logic low value inserted before (i.e., to the left of) its most-significant bit (MSB); c) the one's complement of the first mantissa portion with a 1 value inserted before its MSB; and d) the first mantissa portion with two 0 values inserted before its MSB, and its LSB truncated.

In low-order to high-order sequence, the second 4:1 multiplexer 245 is coupled to receive a) the one's complement of the second mantissa portion with a 1 or logic high value appended to its LSB; b) the second mantissa portion with a 0 or logic low value inserted before its most-significant bit (MSB); c) the one's complement of the second mantissa portion with a 1 value inserted before its MSB; and d) the second mantissa portion with two 0 values inserted before its MSB, and its LSB truncated.

Those skilled in the art will recognize that within the context of (n+1)-bit mantissa portions, the signals presented to the first and second 4:1 multiplexer inputs, in low-order to high-order sequence, are respectively equivalent to a) one's complemented mantissa portions having a rounding bit in their LSB positions; b) mantissa portions shifted rightward by one bit; c) one's complemented mantissa portions shifted rightward by one bit; and d) mantissa portions shifted rightward by two bits. By effectively performing a one-bit right-shift at the outset of an addition or subtraction operation, the present invention eliminates a subsequent right-shift.

Figure 10:
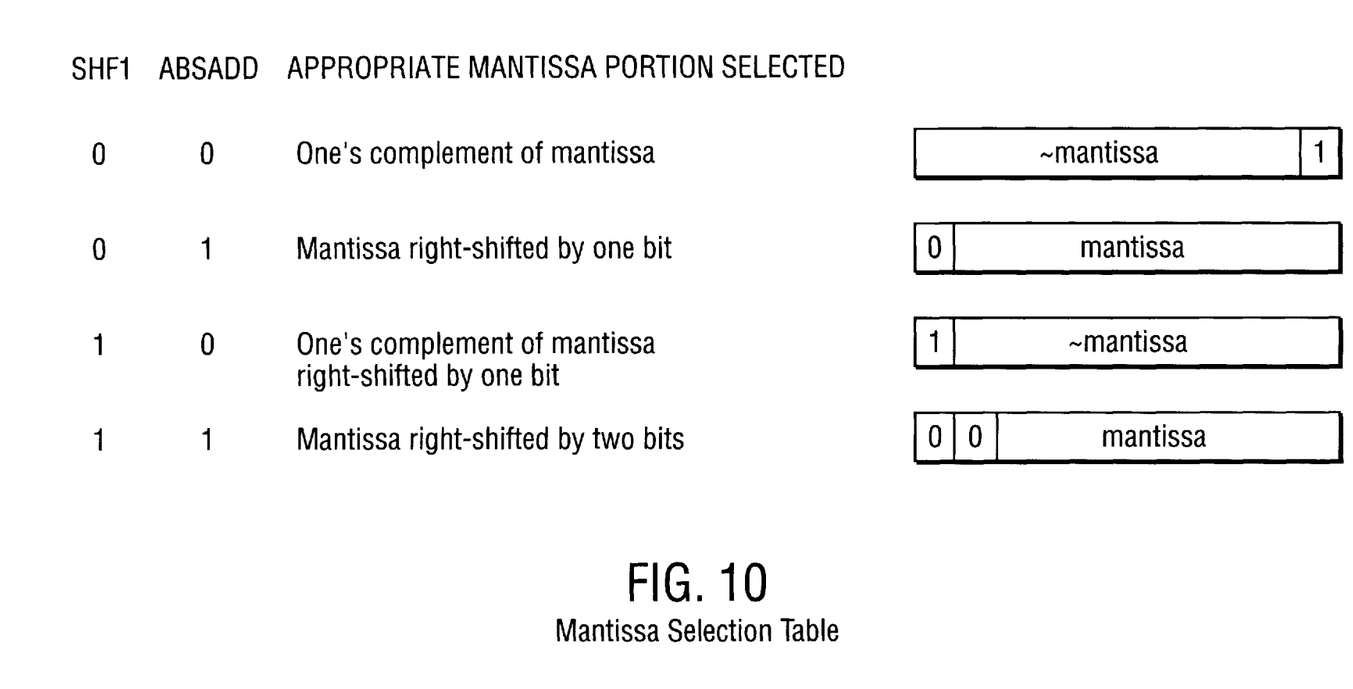
FIG. 10 is a table showing preferred mantissa portion selection conditions in the present invention.

FIG. 10 is a table showing preferred mantissa portion selection conditions for the one's complement/single-bit shifter 108. The value of SHF1 determines whether a shift of at least one bit-position is required, and that of ABSADD determines whether mantissa portion addition or subtraction is required. A pairwise value of 00 for SHF1/ABSADD corresponds to a no-shift subtraction operation, while a pairwise value of 01 for SHF1/ABSADD corresponds to a no-shift addition operation. A value of 10 for SHF1/ABSADD indicates a subtraction operation involving a shift. Finally, an addition operation involving a shift is indicated when SHF1/ABSADD is 11.

The presence of pairwise SHF1/ABSADD values 00, 01, 10, and 11 at the first 4:1 multiplexer selection input respectively results in the routing of the aforementioned low-order to high-order input signals to the first selected mantissa line 150, in a manner well understood by those skilled in the art. Similarly, the presence of SHF1/ABSADD values 00, 01, 10, 11 at the second 4:1 multiplexer selection input routes a corresponding low-order to high-order input signal to the second selected mantissa line 155.

Through the circuitry described above, the present invention facilitates the comparison of two numbers in parallel with one's complementation and single-bit shifting. The ability to simultaneously perform a one's complement, a partial shift, and a magnitude comparison greatly reduces the latency associated with the present invention relative to the prior art. Depending upon implementation details, the present invention may also provide a lower-cost circuit.

Figure 11:
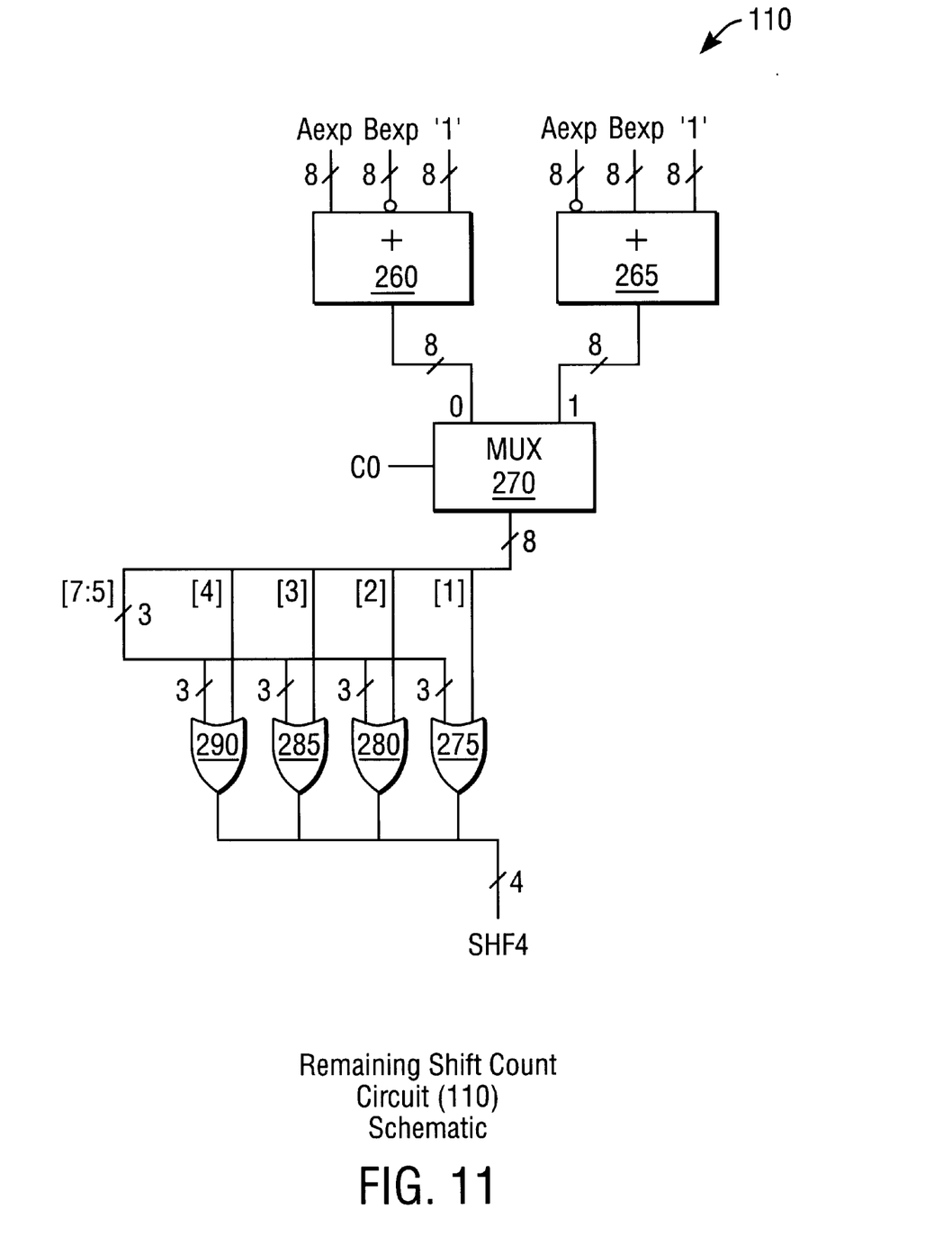
FIG. 11 is a circuit diagram of a preferred embodiment of a remaining shift count circuit of the present invention.

FIG. 11 is a circuit diagram of a preferred embodiment of the remaining shift count circuit 110 of the present invention. The remaining shift count circuit 110 comprises a first and a second adder 260, 265, a multiplexer 270, and a 4:1 OR gate arrangement 275, 280, 285, 290. The first adder 260 is coupled to receive the first exponent portion Aexp, and the second exponent portion Bexp inverted. The second adder 265 is coupled to receive the first exponent portion Aexp inverted, and the second exponent portion Bexp. Each adder 260, 265 is also coupled to receive a logic 1 value.

The multiplexer 270 is coupled to receive an (Aexp-Bexp) signal output by the first adder 260; and a (Bexp-Aexp) signal output by the second adder 265. The multiplexer 270 includes a control input coupled to receive the comparison signal CO, and an output at which the multiplexor 270 exerts an exponential difference signal EXPDIFF. Based upon the value of the CO signal, the multiplexer 270 routes the magnitude of the difference between the first and second exponent portions Am and Bm to its output. Thus, if CO equals 1, EXPDIFF equals (Bexp-Aexp); otherwise, EXPDIFF equals (Aexp-Bexp).

The 4:1 OR gate arrangement 275, 280, 285, 290 includes inputs that receive particular bits of the EXPDIFF signal, and an output that forms the remaining shift count line 158, upon which the OR gate arrangement 275, 280, 285, 290 exerts a remaining shift signal SHF4. As described above, the present invention selectively routes one-bit shifted versions of the mantissa portions Am and Bm to the first and second selected mantissa lines 150, 155. The purpose of SHF4 is to indicate a remaining amount by which the mantissa portion having the smaller magnitude should be shifted relative to that with the larger magnitude.

For the preferred case of 8-bit exponent portions, a first OR gate 275 is coupled to receive the first, fifth, sixth, and seventh bits of the EXPDIFF signal. A second OR gate 280 is coupled to receive the second, fifth, sixth, and seventh bits of EXPDIFF. A third OR gate 285 receives the third, fifth, sixth, and seventh bits of EXPDIFF; and a fourth OR gate 290 receives the fourth, fifth, sixth, and seventh EXPDIFF signal bits.

In the preferred embodiment, the value of the SHF4 signal represents one-half of the shift amount to be applied to the smaller-magnitude mantissa portion. Thus, for example, a SHF4 value of 3 indicates a 6-bit right-shift is required. If the required shift amount were greater than the width of the mantissa portion in question or the maximum value capacity of the remaining shift count line 158, the mantissa portion should simply be zeroed out. Thus, for j-bit exponent portions and k-bit mantissa portions, if any of the (j-q) highest order EXPDIFF signal bits equal 1, where $2^{(j-q)}>k$, the smaller-magnitude mantissa portion should be zeroed-out. Particular to the preferred embodiment, if any of the three highest-order bits 7:5 of EXPDIFF are nonzero, then the exponent difference between the two floating point numbers is greater than 31. Since the preferred mantissa portions span 20 bits, a 31-bit right shift applied to a mantissa portion sets it to zero.

Effectively, then, the 4:1 OR gate arrangement 275, 280, 285, 290 is used to selectively overload the amount of right-shift the smaller-magnitude mantissa portion should receive. Thus, if any of the EXPDIFF signal's bits 7:5 are nonzero, SHF4 is set to 1111, indicating that the appropriate mantissa portion is to be shifted 31 times and effectively set to zero. Those skilled in the art will understand the manner in which the OR gate arrangement 275, 280, 285, 290 can be scaled to accommodate other floating point number representations in alternate embodiments.

Figure 12:
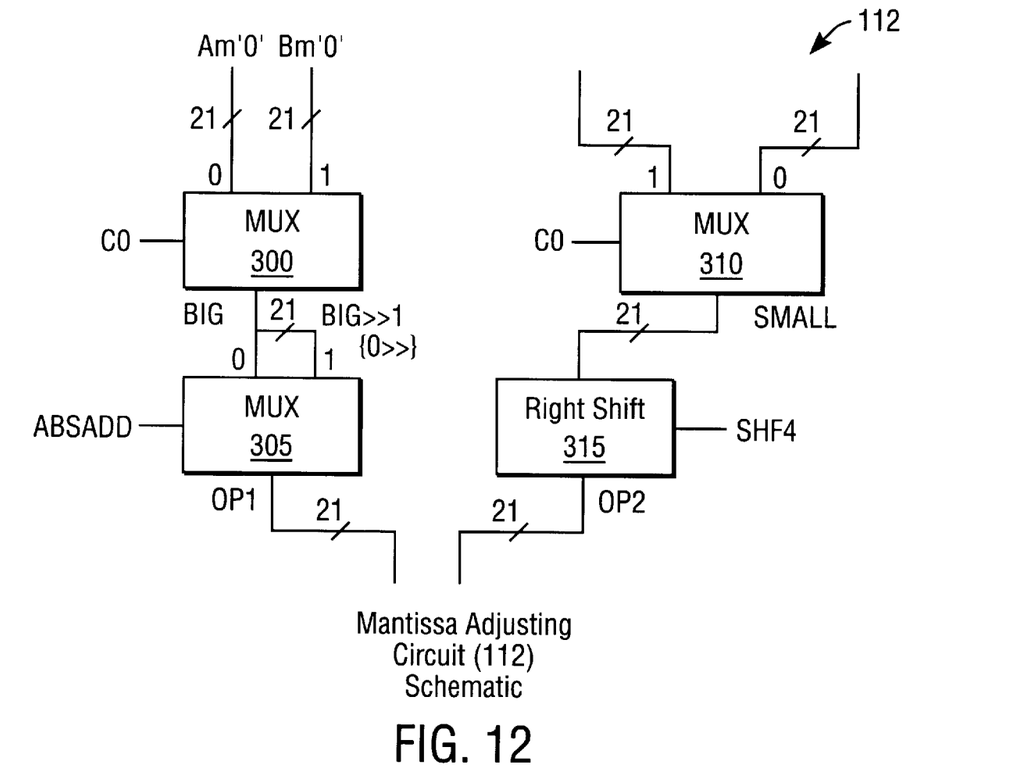
FIG. 12 is a circuit diagram of a preferred embodiment of a mantissa adjusting circuit of the present invention.

FIG. 12 is a circuit diagram of a preferred embodiment of the mantissa adjusting circuit 112 of the present invention. The mantissa adjusting circuit 112 comprises a first, a second, and a third multiplexor 300, 305, 310, and a shift register 315. The first and second multiplexer 300, 305 form a "big pipe" that performs a pre-addition adjustment upon the larger of mantissa portions Am and Bm, in accordance with the operation required. The third multiplexer 310 and the shift register 315 form a "small pipe" for performing a pre-addition adjustment upon the smaller-magnitude mantissa portion. The provision of one circuit path for handling the larger-magnitude mantissa portion, and another circuit path for handling the smaller-magnitude mantissa portion means that the big pipe treats a mantissa portion as a positive number, while the small pipe treats a mantissa portion as either a positive or negative number in accordance with the absolute addition and absolute subtraction conditions defined above.

The first multiplexer 300 is coupled to receive (n+1)-bit versions of the first and second mantissa portions Am and Bm, which are formed by appending a 0 value to their LSB positions. The first multiplexer 300 also receives the CO signal at a control input. When CO equals 1 (i.e., Am<Bm), the first multiplexer 300 outputs the second mantissa portion Bm as a BIG signal; otherwise, the first multiplexer 300 outputs Am as the BIG signal.

The second multiplexer 305 is coupled to receive the BIG signal at a low-order input, as well as the BIG signal shifted rightward by one bit position, with a leading zero, at a second input. The second multiplexer 305 is additionally coupled to receive the ABSADD signal at a control input. The second multiplexer 305 outputs a first operand signal OP1 to the first operand line 160. When ABSADD equals 0, indicating absolute subtraction is required, the second multiplexer 305 outputs the BIG signal to the first operand line 160. When ABSADD equals 1, the second multiplexer 305 outputs the right-shifted BIG signal as OP1.

The third multiplexer 310 includes a low-order input coupled to the second selected mantissa line 150, a high-order input coupled to the first selected mantissa line 155, a control input coupled to receive the CO signal, and an output that provides a SMALL signal. When CO equals 1 (i.e., Am<Bm), the third multiplexer 310 outputs as the SMALL signal the version of the first mantissa portion Am provided by the one's complement/single bit shifter 108. When CO equals 0, the third multiplexer 310 outputs as the SMALL signal the version of the second mantissa portion Bm provided by the one's complement/single-bit shifter 108.

The shift register 315 includes an input coupled to receive the SMALL signal, a count input coupled to receive the remaining shift count signal SHF4, and an output coupled to second operand line 165. In the preferred embodiment, the shift register 315 shifts the SMALL signal by an amount equal to twice the value of SHF4, and outputs the shifted SMALL signal as a second operand OP2.

In accordance with the description herein with relation to FIGS. 9, 10, and 12, when ABSADD indicates an absolute addition is required, OP1 comprises an (n+1)-bit version of the larger-magnitude mantissa portion, right-shifted by one bit position to allow for the generation of a carry-over or carry-out signal. Similarly, OP2 comprises an (n+1)-bit version of the smaller-magnitude mantissa portion that is effectively right-shifted 1 bit-position to handle a carry-out condition, and further right-shifted in accordance with mantissa portion alignment requirements due to any difference between the values of the first and second exponent portions Aexp and Bexp.

When ABSADD indicates an absolute subtraction is required, OP1 comprises an (n+1)-bit version of the larger-magnitude mantissa portion that incorporates a rounding bit in its LSB position. OP2 comprises an (n+1)-bit version of the smaller-magnitude mantissa portion that has had a rounding bit incorporated into its LSB position, or a series of right-shifts in accordance with the aforementioned mantissa portion alignment requirements. Because absolute subtraction in the present invention involves the subtraction of the smaller-magnitude mantissa portion from the larger-magnitude mantissa portion, an absolute subtraction operation will not produce a carry-out condition.

Figure 13:
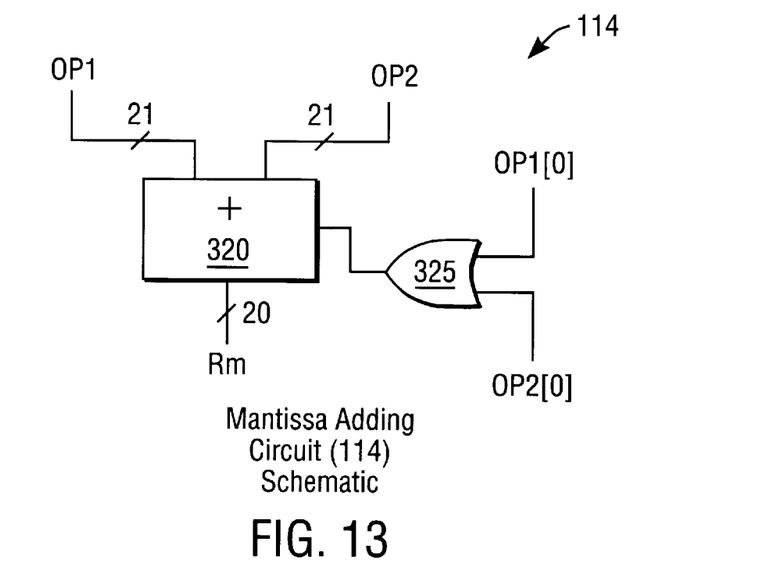
FIG. 13 is a circuit diagram of a preferred embodiment of a mantissa adding circuit of the present invention.

FIG. 13 is a circuit diagram of a preferred embodiment of a mantissa adding circuit 114 of the present invention. The mantissa adding circuit 114 comprises an adder 320 and an OR gate 325. The adder 320 has a first and a second input coupled to receive the first and second operand signals OP1 and OP2, respectively. The OR gate 325 includes a first and second input respectively coupled to receive the low order bit of OP1 and OP2, and an output that provides a carry-in signal to a carry input of the adder 320. Finally, the adder 320 includes an output coupled to the resulting mantissa portion line 50. The adder 320 generates the sum of OP1 plus OP2 plus the carry-in signal. The carry-in signal completes a two's complement when ABSADD equals 0. The sum generated by the adder 320 is the resulting mantissa portion Rm.

Figure 14:
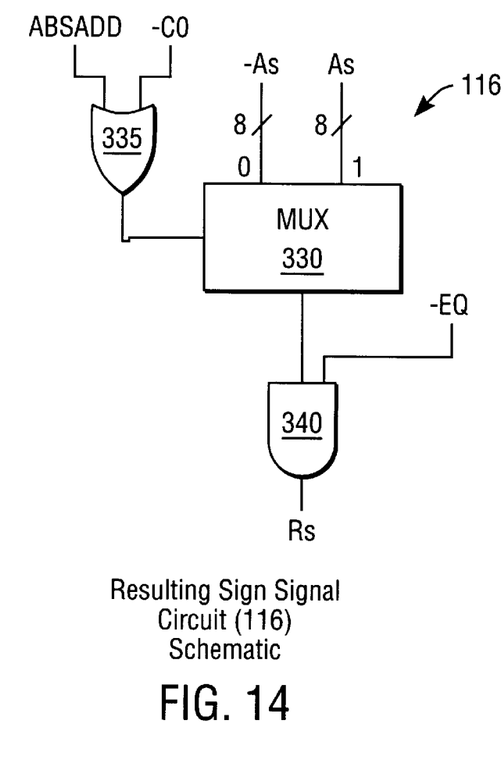
FIG. 14 is a circuit diagram of a preferred embodiment of a resulting sign circuit of the present invention.

FIG. 14 is a circuit diagram of a preferred embodiment of a resulting sign circuit 116 of the present invention. The resulting sign circuit 116 comprises a multiplexer 330, an OR gate 335, and an AND gate 340. The OR gate 335 is coupled to receive the ABSADD signal and the inverted comparison signal CO. The multiplexer 330 is coupled to receive the inverted first sign portion As at a low-order input; the first sign portion As at a high-order input; and an output of the OR gate 335 at a control input. Based upon the signal values presented to the OR gate inputs, the multiplexer 330 outputs an intermediate sign signal.

The AND gate 340 is coupled to receive the intermediate sign signal, as well as the inverse of the equal signal EQ generated by the magnitude comparator 106. The AND gate 340 is coupled to output the resulting sign signal Rs upon the resulting sign line 40. In the event that the EQ signal has a 1 or logic high value, which occurs when an absolute subtraction is to be performed upon equal-magnitude numbers, the resulting sign signal Rs is zero, indicating that the result of the operation is zero. Otherwise, Rs takes the value of the intermediate sign signal, and indicates whether the resulting mantissa portion Rm is positive or negative.

Figure 15:
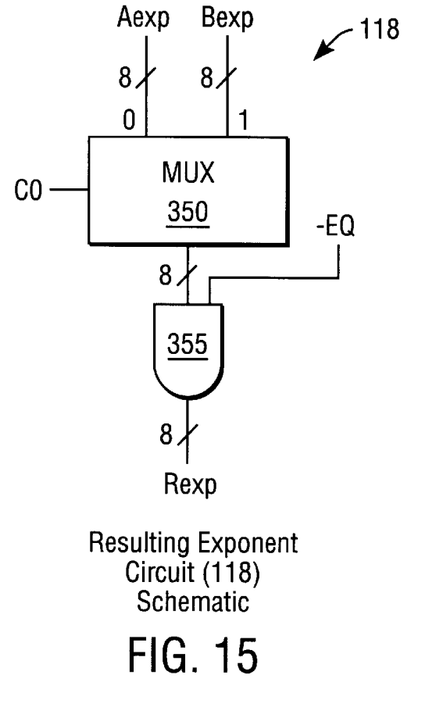
FIG. 15 is a circuit diagram of a preferred embodiment of a resulting exponent circuit of the present invention.

FIG. 15 is a circuit diagram of a preferred embodiment of a resulting exponent circuit 118 of the present invention. The resulting exponent circuit 118 comprises a multiplexer 350 and an AND gate 355. The multiplexer 350 includes a low-order input coupled to receive the first exponent portion Aexp, a high-order input coupled to receive the second exponent portion Bexp, a control input coupled to receive the comparison signal CO, and an output that provides an intermediate exponent signal. The multiplexor 350 outputs the exponent portion of the larger-magnitude floating point number as the intermediate exponent signal. Thus, if CO equals 1 (Am<Bm), the intermediate exponent signal is set to Bexp; otherwise, the intermediate exponent signal equals Aexp.

The AND gate 355 includes first and second inputs coupled to receive the intermediate exponent signal and the inverted EQ signal, and further includes an output coupled to the resulting exponent line 45. In the event that EQ equals 1, indicating an absolute subtraction is to be performed upon equal-magnitude numbers, the AND gate 355 outputs a zero as the resulting exponent signal Rexp, indicating the result of the operation is zero. Otherwise, the AND gate 355 outputs the intermediate exponent signal as the resulting exponent signal Rexp.

Figure 16:
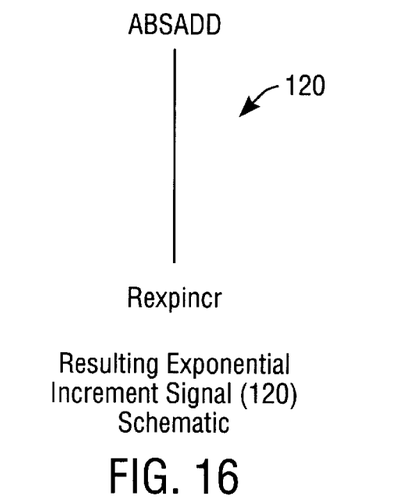
FIG. 16 is a circuit diagram showing a preferred circuit for generating a resulting exponent increment signal of the present invention.

FIG. 16 is a circuit diagram showing a preferred generation or derivation of the resulting exponent increment signal Rexpincr from the absolute add line 130. In the present invention, Rexpincr equals ABSADD. An Rexpincr value of 1 or logic high indicates that the resulting exponent portion Rexp needs to be incremented. Additional conventional circuitry (i.e., an adder, not shown) is used to increment the resulting exponent signal Rexp in accordance with the value of Rexpincr, in a manner well understood by those skilled in the art. Those skilled in the art will also readily understand that additional conventional circuitry (not shown) is employed in the event that the result bits R generated by the present invention are to be represented according to an alternate floating point number format.

The present invention advantageously initiates mantissa portion alignment operations in parallel with the determination of an exponent portion difference. That is, mantissa portion alignment begins before the exponent portion difference determination completes. The present invention additionally eliminates two's complement circuitry found in the prior art.

While the present invention has been described with reference to certain preferred embodiments, those skilled in the art will recognize that various modifications may be provided. As a first example, the present invention could be designed to only add or only subtract. As a second example, the one's complement/single-bit shift operations could be performed by separate logic stages. As a third example, the shift register 315 within the mantissa adjusting circuit 112 could include logic to limit the maximum number of right shifts to the minimum number that would ensure that a mantissa portion could be successfully zeroed-out. As a fourth example, the remaining shift count circuit 110 could employ a first and a second 4:1 OR gate arrangement respectively coupled to the first and second adders' outputs, such that the multiplexer 270 selects a first or second version of the remaining shift count signal SHF4. The description herein provides for these and other modifications to the present invention, which is limited only by the following claims:

What is claimed is:

1. A method for performing one from a group of an addition operation and a subtraction operation upon a first floating point number comprising a signal having a first sign portion, a first exponent portion, and a first mantissa portion, and a second floating point number comprising a signal having a second sign portion, a second exponent portion, and a second mantissa portion, the method being implemented in a computer and permitting the computer to increase in efficiency and speed during the addition operation or subtraction operation, the method comprising:

generating an exponent portion difference signal;

generating a magnitude comparison signal that consistently indicates whether the magnitude of the first floating point number is less than that of the second floating point number;

performing a first set of mantissa portion alignment operations in parallel with generation of the exponent portion difference signal, with generating the magnitude comparison signal, and with at least one of a one's complement operation and bit position shift operation on one of the first mantissa portion and the second mantissa portion, wherein the step of performing the first set of mantissa portion alignment operation comprises: receiving a first selector input signal including a one's complement of the first mantissa portion with a logic high value appended to the least significant bit of the first mantissa portion, receiving a second selector input signal including the first mantissa portion with a logic low value inserted before the most significant bit of the first mantissa portion, receiving a third selector input signal including a one's complement of the first mantissa portion with a logic high value inserted before the most significant bit of the first mantissa portion, and receiving a fourth selector input signal including the first mantissa portion with two logic low values inserted before the most significant bit of the first mantissa portion, the fourth selector input signal having the least significant bit of the first mantissa portion truncated;

wherein the step of performing the first set of mantissa portion alignment operation further comprises: receiving a fifth selector input signal including a one's complement of the second mantissa portion with a logic high value appended to the least significant bit of the second mantissa portion, receiving a sixth selector input signal including the second mantissa portion with a logic low value inserted before the most significant bit of the second mantissa portion, receiving a seventh selector input signal including a one's complement of the second mantissa portion with a logic high value inserted before the most significant bit of the second mantissa portion, and receiving an eight selector input signal including the second mantissa portion with two logic low values inserted before the most significant bit of the second mantissa portion, the eight selector input signal having the least significant bit of the second mantissa portion truncated;

performing an addition operation; and outputting a resulting floating point signal comprising a resulting sign portion, a resulting exponent portion, and a resulting mantissa portion, the resulting floating point signal corresponding to one from the group of a sum of the first and second floating point numbers and a difference between the first and second floating point numbers.

2. The method of claim 1, wherein the performance of the first set of mantissa portion alignment operations comprises the step of determining whether the operation will produce a result having a magnitude equal to the sum of the first and second floating point numbers' magnitudes.

3. The method of claim 1, wherein the performance of the first set of mantissa portion alignment operations comprises the step of determining a partial mantissa portion shift amount.

4. The method of claim 1, wherein the performance of the first set of mantissa portion alignment operations further comprises: selecting one from a group of a mantissa portion, a shifted mantissa portion, and a complemented mantissa portion as an addend.

5. The method of claim 1, wherein the performance of the first set of mantissa portion alignment operations further comprises: generating a mantissa portion having an extra bit appended to its least-significant bit position.

6. The method of claim 1, wherein the performance of the first set of mantissa portion alignment operations comprises: generating a mantissa portion having an extra bit inserted at its most-significant bit position.

7. The method of claim 1, wherein the performance of the first set of mantissa alignment operations further comprises:

selecting a larger-magnitude mantissa portion; and selecting one from a group of a mantissa portion, a shifted mantissa portion, and a complemented mantissa portion as a smaller-magnitude mantissa portion.

8. The method of claim 1, further comprising:

determining a mantissa portion shift amount; and performing a second set of mantissa portion alignment operations.

9. A system for performing one from a group of an addition operation and a subtraction operation upon a first floating point number comprising a signal having a first sign portion, a first exponent portion, and a first mantissa portion, and a second floating point number comprising a signal having a second sign portion, a second exponent portion, and a second mantissa portion, the system comprising:

an exponent comparison circuit for determining an exponent portion difference, the exponent comparison circuit having inputs coupled to receive the first and second exponent portions, and an output;

a magnitude comparison circuit for identifying a smaller-magnitude floating point number, the magnitude comparison circuit having inputs coupled to receive the first exponent portion, the second exponent portion, at least part of the first mantissa portion, and at least part of the second mantissa portion, and having an output at which a comparison signal is generated;

a mantissa alignment circuit for selectively shifting a mantissa portion, the mantissa alignment circuit having inputs coupled to receive the first and second mantissa portions, a shift input coupled to the output of the exponent comparison circuit, a magnitude-selection input coupled to the output of the magnitude comparison circuit, and a first and second output;

wherein the mantissa alignment circuit includes a selector circuit configured to: receive a first selector input signal including a one's complement of the first mantissa portion with a logic high value appended to the least significant bit of the first mantissa portion, receive a second selector input signal including the first mantissa portion with a logic low value inserted before the most significant bit of the first mantissa portion, receive a third selector input signal including a one's complement of the first mantissa portion with a logic high value inserted before the most significant bit of the first mantissa portion, and receive a fourth selector input signal including the first mantissa portion with two logic low values inserted before the most significant bit of the first mantissa portion, the fourth selector input signal having the least significant bit of the first mantissa portion truncated;

a selector circuit further configured to: receive a fifth selector input signal including a one's complement of the second mantissa portion with a logic high value appended to the least significant bit of the second mantissa portion, receive a sixth selector input signal including the second mantissa portion with a logic low value inserted before the most significant bit of the second mantissa portion, receive a seventh selector input signal including a one's complement of the second mantissa portion with a logic high value inserted before the most significant bit of the second mantissa portion, and receive an eight selector input signal including the second mantissa portion with two logic low values inserted before the most significant bit of the second mantissa portion, the eight selector input signal having the least significant bit of the second mantissa portion truncated; and an adder for generating a resulting mantissa portion, the adder having an output, a first input coupled to the first output of the mantissa selection circuit, and a second input coupled to the second output of the mantissa selection circuit, wherein the mantissa alignment circuit operates in parallel with the exponent comparison circuit and with the magnitude comparison circuit.

10. The system of claim 9, wherein the mantissa alignment circuit comprises an absolute addition circuit having inputs coupled to receive the first and second sign portions, and an output at which an absolute addition signal is generated, the absolute addition signal indicating whether the operation will produce a result having a magnitude equal to the sum of the first and second floating point numbers' magnitudes.

11. The system of claim 9, wherein the mantissa alignment circuit comprises a partial shift circuit having inputs coupled to receive part of the first exponent portion and part of the second exponent portion, and an output at which a partial shift signal is generated, the partial shift signal indicating whether to shift a mantissa portion before the exponent difference is determined.

12. The system of claim 9, further comprising a shift count circuit having an input coupled to the output of the exponent difference circuit, and an output coupled to the mantissa alignment circuit's shift input.

13. A system for performing one from a group of an addition operation and a subtraction operation upon a first floating point number comprising a signal having a first sign portion, a first exponent portion, and a first mantissa portion, and a second floating point number comprising a signal having a send sign portion, a second exponent portion, and a second mantissa portion, the system comprising:

an absolute addition circuit having inputs coupled to receive the first and second sign portions, and an output at which an absolute addition signal is generated, the absolute addition signal indicating whether the operation will produce a result having a magnitude equal to the sum of the first and second floating point numbers' magnitudes;

a magnitude comparison circuit for identifying a smaller-magnitude floating point number, the magnitude comparison circuit having inputs coupled to receive the first exponent portion, the second exponent portion, at least part of the first mantissa portion, and at least part of the second mantissa portion, and having an output at which a comparison signal is generated;

a magnitude-selective addition circuit having inputs coupled to receive the first and second mantissa portions, a first control input coupled to the output of the absolute addition circuit, a second control input coupled to the output of the magnitude comparison circuit, and an output that provides a resulting mantissa portion;

wherein the magnitude-selective addition circuit includes a selector circuit configured to: receive a first selector input signal including a one's complement of the first mantissa portion with a logic high value appended to the least significant bit of the first mantissa portion, receive a second selector input signal including the first mantissa portion with a logic low value inserted before the most significant bit of the first mantissa portion, receive a third selector input signal including a one's complement of the first mantissa portion with a logic high value inserted before the most significant bit of the first mantissa portion, and receive a fourth selector input signal including the first mantissa portion with two logic low values inserted before the most significant bit of the first mantissa portion, the fourth selector input signal having the least significant bit of the first mantissa portion truncated;

the selector circuit further configured to: receive a fifth selector input signal including a one's complement of the second mantissa portion with a logic high value appended to the least significant bit of the second mantissa portion, receive a sixth selector input signal including the second mantissa portion with a logic low value inserted before the most significant bit of the second mantissa portion, receive a seventh selector input signal including a one's complement of the second mantissa portion with a logic high value inserted before the most significant bit of the second mantissa portion, and receive an eight selector input signal including the second mantissa portion with two logic low values inserted before the most significant bit of the second mantissa portion, the eight selector input signal having the least significant bit of the second mantissa portion truncated.

* * * * *